(12) United States Patent
Major et al.

(10) Patent No.: US 12,371,093 B2
(45) Date of Patent: Jul. 29, 2025

(54) SYNCHRONIZED STEERING CONTROL SYSTEMS FOR FORKLIFTS

(71) Applicant: Toyota Material Handling, Inc., Columbus, IN (US)

(72) Inventors: Joseph Major, Indianapolis, IN (US); Kevin Partridge, Columbus, IN (US)

(73) Assignee: Toyota Material Handling, Inc., Columbus, IN (US)

( * ) Notice: Subject to any disclaimer, the term of this patent is extended or adjusted under 35 U.S.C. 154(b) by 163 days.

(21) Appl. No.: 18/240,329

(22) Filed: Aug. 30, 2023

(65) Prior Publication Data

US 2024/0101182 A1 Mar. 28, 2024

Related U.S. Application Data

(60) Provisional application No. 63/411,072, filed on Sep. 28, 2022.

(51) Int. Cl.
| | |
|---|---|
| *B62D 5/00* | (2006.01) |
| *B62D 5/04* | (2006.01) |
| *B62D 15/02* | (2006.01) |
| *B66F 9/075* | (2006.01) |

(52) U.S. Cl.
CPC ............. *B62D 5/001* (2013.01); *B62D 5/008* (2013.01); *B62D 5/0427* (2013.01); *B62D 5/0448* (2013.01); *B62D 5/046* (2013.01); *B62D 5/0469* (2013.01); *B62D 15/0225* (2013.01); *B66F 9/0755* (2013.01); *B66F 9/07568* (2013.01); *B66F 9/07572* (2013.01)

(58) Field of Classification Search
None
See application file for complete search history.

(56) References Cited

U.S. PATENT DOCUMENTS

| | | | |
|---|---|---|---|
| 4,712,027 A | 12/1987 | Karidis et al. | |
| 5,181,173 A | 1/1993 | Avitan | |
| 5,347,458 A | 9/1994 | Serizawa et al. | |
| 5,908,457 A | 6/1999 | Higashira et al. | |
| 6,079,513 A * | 6/2000 | Nishizaki | B62D 15/0235 |
| | | | 701/41 |
| 6,097,286 A | 8/2000 | Discenzo | |
| 6,219,604 B1 | 4/2001 | Dilger et al. | |
| 6,370,460 B1 | 4/2002 | Kaufmann et al. | |
| 6,535,806 B2 | 3/2003 | Millsap et al. | |
| 6,554,095 B2 | 4/2003 | Zheng et al. | |
| 6,678,595 B2 | 1/2004 | Zheng et al. | |

(Continued)

FOREIGN PATENT DOCUMENTS

| | | | | |
|---|---|---|---|---|
| CA | 3168130 A1 | * | 1/2023 | ............. B62D 5/001 |
| CA | 3209767 A1 | * | 3/2024 | ......... B62D 15/0225 |

(Continued)

*Primary Examiner* — Kevin R Steckbauer
(74) *Attorney, Agent, or Firm* — Barnes & Thornburg

(57) ABSTRACT

A steer-by-wire control system adapted for use with a material handling vehicle such as a forklift includes a controller programmed to receive input indicative of a desired direction of travel of the material handling vehicle and to control an actuator coupled with the steered wheels of the material handling vehicle to change the direction of travel of the vehicle and synchronize the direction of travel with a position of a steering wheel of the material handling vehicle.

20 Claims, 9 Drawing Sheets

(56) References Cited

U.S. PATENT DOCUMENTS

| | | | |
|---|---|---|---|
| 6,678,596 B2 | 1/2004 | Husain et al. | |
| 6,681,882 B2 | 1/2004 | Zheng et al. | |
| 6,687,588 B2 | 2/2004 | Demerly et al. | |
| 6,694,239 B1 | 2/2004 | Yao et al. | |
| 6,712,175 B2 | 3/2004 | Kind et al. | |
| 6,728,615 B1 | 4/2004 | Yao et al. | |
| 6,751,539 B2 | 6/2004 | Uenuma et al. | |
| 6,782,969 B2 | 8/2004 | Kodama et al. | |
| 6,799,105 B2 | 9/2004 | Stout et al. | |
| 6,799,654 B2 | 10/2004 | Menjak et al. | |
| 6,801,840 B2 | 10/2004 | Kodama et al. | |
| 6,807,471 B2 | 10/2004 | Fujimori | |
| 6,843,344 B2 | 1/2005 | Kodama et al. | |
| 6,871,127 B2 | 3/2005 | Dominke et al. | |
| 6,886,656 B2 | 5/2005 | Fujioka et al. | |
| 6,913,109 B2 | 7/2005 | Kodama et al. | |
| 6,915,194 B2 | 7/2005 | Kodama et al. | |
| 6,918,460 B2 | 7/2005 | Tajima et al. | |
| 6,938,725 B2 | 9/2005 | Fujioka et al. | |
| 6,973,989 B2 | 12/2005 | Williams | |
| 6,983,816 B2 * | 1/2006 | Takahashi | B62D 5/006 180/402 |
| 7,004,278 B2 | 2/2006 | Sugitani et al. | |
| 7,034,483 B2 * | 4/2006 | Takahashi | B62D 6/008 318/434 |
| 7,130,728 B2 * | 10/2006 | Suzuki | B62D 6/008 180/413 |
| 7,191,864 B2 * | 3/2007 | Sugitani | B62D 6/008 180/402 |
| 7,207,411 B2 * | 4/2007 | Duits | B62D 5/005 701/41 |
| 7,234,563 B2 * | 6/2007 | Ogawa | B62D 5/0496 701/41 |
| 7,278,509 B2 | 10/2007 | Schroder et al. | |
| 7,295,905 B2 | 11/2007 | Yao et al. | |
| 7,325,644 B2 | 2/2008 | Sakai | |
| 7,418,326 B2 * | 8/2008 | Ogawa | B62D 6/008 701/41 |
| 7,558,657 B2 | 7/2009 | Manken et al. | |
| 7,581,616 B2 | 9/2009 | Goto et al. | |
| 7,676,309 B2 | 3/2010 | Tamaki et al. | |
| 7,832,522 B2 | 11/2010 | Akuta et al. | |
| 7,849,955 B2 * | 12/2010 | Crabill | B66F 9/24 701/41 |
| 7,885,742 B2 | 2/2011 | Yamazaki et al. | |
| 7,908,056 B2 | 3/2011 | Hwang | |
| 8,010,254 B2 | 8/2011 | Chai et al. | |
| 8,172,033 B2 * | 5/2012 | Corbett | B66F 9/075 180/402 |
| 8,224,528 B2 | 7/2012 | Hayama et al. | |
| 8,234,042 B2 * | 7/2012 | Bolio | B62D 5/008 180/402 |
| 8,511,420 B2 * | 8/2013 | Kojo | B62D 6/002 180/443 |
| 8,532,876 B2 * | 9/2013 | Igarashi | B62D 5/008 701/41 |
| 8,544,592 B2 | 10/2013 | Goutsu et al. | |
| 8,554,415 B2 | 10/2013 | Takazato | |
| 8,589,029 B2 | 11/2013 | Egenfeldt | |
| 8,706,354 B2 | 4/2014 | Imamura et al. | |
| 8,718,873 B2 | 5/2014 | Kushiro | |
| 8,855,859 B2 | 10/2014 | Hayama | |
| 8,855,862 B2 | 10/2014 | Tashiro | |
| 8,855,864 B2 | 10/2014 | Herschel et al. | |
| 8,874,320 B2 * | 10/2014 | Barthomeuf | B62D 6/003 701/42 |
| 9,050,999 B2 | 6/2015 | Kuipers et al. | |
| 9,108,667 B2 | 8/2015 | Hayama et al. | |
| 9,327,765 B2 | 5/2016 | Takeda | |
| 9,446,792 B2 | 9/2016 | Takeda | |
| 9,469,335 B2 | 10/2016 | Sato et al. | |
| 9,505,428 B2 | 11/2016 | Chai et al. | |
| 9,623,900 B2 * | 4/2017 | Yukitake | B62D 5/003 |
| 9,731,761 B1 * | 8/2017 | Park | B62D 15/025 |
| 9,771,102 B2 | 9/2017 | Sakurai | |
| 9,994,249 B2 | 6/2018 | Kageyama et al. | |
| 10,011,297 B2 | 7/2018 | Oya et al. | |
| 10,017,206 B2 | 7/2018 | Kawaguchi et al. | |
| 10,196,122 B1 * | 2/2019 | Andrasko | B63H 25/02 |
| 10,272,941 B2 | 4/2019 | Sakamaki et al. | |
| 10,399,597 B2 | 9/2019 | Varunjikar et al. | |
| 10,414,288 B2 | 9/2019 | Mangette | |
| 10,449,999 B2 | 10/2019 | During et al. | |
| 10,461,606 B2 | 10/2019 | Ognibene et al. | |
| 10,507,493 B2 | 12/2019 | Houston et al. | |
| 10,696,321 B2 * | 6/2020 | Riot | B66F 9/07568 |
| 10,766,522 B2 * | 9/2020 | Bremkens | B62D 5/0472 |
| 11,066,095 B2 * | 7/2021 | Kodera | B62D 6/02 |
| 11,155,296 B2 | 10/2021 | Codonesu et al. | |
| 11,214,296 B2 * | 1/2022 | Engels | B62D 5/0421 |
| 11,518,430 B2 * | 12/2022 | Sano | B62D 7/1581 |
| 11,760,407 B2 * | 9/2023 | Engels | B62D 5/006 701/42 |
| 11,884,317 B2 * | 1/2024 | Loos | B60R 16/037 |
| 11,964,709 B2 * | 4/2024 | Kodera | B62D 6/00 |
| 12,049,263 B2 * | 7/2024 | Kodera | B62D 6/002 |
| 12,084,137 B2 * | 9/2024 | Kuragaki | B62D 5/0481 |
| 2003/0028306 A1 * | 2/2003 | Fujimori | B62D 6/002 180/443 |
| 2003/0047374 A1 * | 3/2003 | Peppler | B62D 5/0421 180/443 |
| 2003/0114970 A1 * | 6/2003 | Hara | B62D 5/008 180/443 |
| 2003/0201136 A1 * | 10/2003 | Ueno | B62D 5/0484 180/443 |
| 2003/0230448 A1 | 12/2003 | Guldner et al. | |
| 2004/0193346 A1 * | 9/2004 | Sugiyama | B62D 5/046 180/443 |
| 2004/0211618 A1 * | 10/2004 | Ogawa | B62D 5/046 180/402 |
| 2004/0238257 A1 * | 12/2004 | Takahashi | B62D 6/008 180/402 |
| 2005/0224276 A1 * | 10/2005 | Sugitani | B62D 6/008 180/402 |
| 2006/0200291 A1 | 9/2006 | Wroblewski | |
| 2009/0037054 A1 * | 2/2009 | Igarashi | B62D 5/008 701/42 |
| 2009/0194358 A1 * | 8/2009 | Corbett | B66F 9/24 180/402 |
| 2009/0228173 A1 * | 9/2009 | Bolio | B62D 5/008 701/41 |
| 2011/0036660 A1 * | 2/2011 | Kojo | B62D 6/002 180/446 |
| 2011/0320090 A1 * | 12/2011 | Barthomeuf | B60W 40/12 701/42 |
| 2013/0096778 A1 * | 4/2013 | Goto | B62D 5/008 701/41 |
| 2013/0245892 A1 * | 9/2013 | Chen | B62D 5/093 701/42 |
| 2015/0330497 A1 | 11/2015 | Amano et al. | |
| 2018/0215411 A1 * | 8/2018 | Riot | B62D 6/02 |
| 2018/0229989 A1 | 8/2018 | Goshima | |
| 2018/0251150 A1 | 9/2018 | Ognibene et al. | |
| 2019/0118853 A1 | 4/2019 | Delmarco et al. | |
| 2019/0144031 A1 * | 5/2019 | Bremkens | B62D 5/046 180/446 |
| 2019/0168807 A1 | 6/2019 | Polmans | |
| 2019/0176882 A1 | 6/2019 | Thompson et al. | |
| 2019/0256133 A1 | 8/2019 | Tsubaki | |
| 2019/0300051 A1 | 10/2019 | Inoue et al. | |
| 2019/0359248 A1 | 11/2019 | Tsubaki | |
| 2019/0367074 A1 * | 12/2019 | Engels | B62D 5/006 |
| 2019/0367075 A1 * | 12/2019 | Kodera | B62D 5/003 |
| 2020/0023893 A1 | 1/2020 | Naik et al. | |
| 2020/0023894 A1 | 1/2020 | Naik et al. | |
| 2020/0047764 A1 | 2/2020 | Yamashita et al. | |
| 2020/0062294 A1 * | 2/2020 | Kodera | B62D 5/008 |
| 2021/0403078 A1 * | 12/2021 | Sano | B60G 3/26 |
| 2022/0063704 A1 * | 3/2022 | Loos | B60R 16/037 |
| 2022/0073128 A1 * | 3/2022 | Engels | B62D 6/008 |
| 2022/0289270 A1 * | 9/2022 | Nichols | B62D 15/0235 |
| 2022/0315105 A1 * | 10/2022 | Kuragaki | B62D 15/025 |

(56) References Cited

U.S. PATENT DOCUMENTS

| | | | | |
|---|---|---|---|---|
| 2023/0026718 A1* | 1/2023 | Major | ...................... | B66F 9/24 |
| 2023/0044665 A1* | 2/2023 | Watanabe | .............. | B62D 5/006 |
| 2024/0067265 A1* | 2/2024 | Dasch | ..................... | B62D 6/02 |
| 2024/0101182 A1* | 3/2024 | Major | ................. | B66F 9/07572 |
| 2025/0074504 A1* | 3/2025 | Reitemann | ............ | B62D 6/001 |

FOREIGN PATENT DOCUMENTS

| | | | | |
|---|---|---|---|---|
| CN | 113460154 A | * | 10/2021 | ............ B60W 10/20 |
| CN | 114401881 A | * | 4/2022 | ........... B62D 15/025 |
| DE | 10109085 A1 | * | 9/2002 | ............ B62D 5/008 |
| DE | 102006041236 A1 | * | 3/2008 | ............ B62D 5/008 |
| DE | 102006041236 B4 | * | 9/2015 | ............ B62D 5/008 |
| DE | 102009002743 B4 | * | 2/2022 | ............ B62D 5/008 |
| DE | 112020004728 T5 | * | 6/2022 | ........... B62D 15/025 |
| EP | 872405 | | 10/1998 | |
| EP | 1325857 A2 | * | 7/2003 | ............ B62D 5/008 |
| EP | 1462339 A2 | * | 9/2004 | ............ B62D 5/008 |
| EP | 1600356 A2 | * | 11/2005 | ............ B62D 5/008 |
| EP | 2020361 A1 | * | 2/2009 | ............ B62D 5/008 |
| EP | 2216234 A1 | * | 8/2010 | ............ B62D 5/008 |
| EP | 2639138 A2 | * | 9/2013 | ............ B62D 5/093 |
| EP | 2216234 B1 | * | 4/2016 | ............ B62D 5/008 |
| EP | 3632774 A1 | * | 4/2020 | ............ B62D 5/008 |
| EP | 3632774 B1 | * | 9/2021 | ............ B62D 5/008 |
| FR | 2905924 A1 | * | 3/2008 | ............ B62D 5/008 |
| FR | 3041921 A1 | * | 4/2017 | ............ B62D 6/002 |
| JP | 7206399 | | 8/1995 | |
| JP | 10287251 | | 10/1998 | |
| JP | 2003048555 A | * | 2/2003 | .............. B62D 5/04 |
| JP | 2003160058 A | * | 6/2003 | ............ B62D 1/163 |
| JP | 2004182058 A | * | 7/2004 | ............ B62D 6/002 |
| JP | 2006021562 A | * | 1/2006 | ............ B62D 5/008 |
| JP | 3887213 B2 | * | 2/2007 | ............ B62D 1/163 |
| JP | 4492230 B2 | * | 6/2010 | ............ B62D 5/008 |
| JP | 2020029194 A | * | 2/2020 | ............ B62D 5/008 |
| JP | 2021059139 A | * | 4/2021 | ........... B62D 15/025 |
| JP | 7133393 B2 | * | 9/2022 | ............ B62D 5/008 |
| JP | 7169957 B2 | * | 11/2022 | ........... B62D 15/025 |
| WO | 9852813 | | 11/1998 | |
| WO | WO-2009066789 A1 | * | 5/2009 | ............ B62D 5/008 |
| WO | 201631058 | | 3/2016 | |
| WO | 2020129760 | | 6/2020 | |
| WO | WO-2021065714 A1 | * | 4/2021 | ........... B62D 15/025 |
| WO | WO-2023156852 A1 | * | 8/2023 | ............ B62D 5/065 |

\* cited by examiner

SYNCHRONIZED STEERING CONTROL SYSTEMS FOR FORKLIFTS

CROSS REFERENCE TO RELATED APPLICATIONS

This application claims priority to and the benefit of U.S. Provisional Patent Application No. 63/411,072, filed 28 Sep. 2022, the disclosure of which is now expressly incorporated herein by reference.

FIELD OF THE DISCLOSURE

The present disclosure relates generally to steering systems, and more specifically to steering systems having a steer-by-wire controller for directing the steered wheels of a vehicle.

BACKGROUND

Hydraulic motors and actuators are used in on and off-highway vehicles such as in the material handling, agriculture, and automotive industries. Hydraulic motors, valves, and actuators may control a variety of vehicle features such as steering, lifting, tilting, rotating, etc. The vehicles may be used to move heavy loads that are supported on a bed or lift mechanism of the vehicle.

Using hydraulics is a relatively reliable and durable way to support and move loads. However, there are some drawbacks associated with hydraulics. As one example, a hydraulic system may experience power loses throughout the components of the system causing the hydraulic system to lose efficiency. While most hydraulic functions are used with an intermediate frequency, for example in a forklift, steering systems may maintain on demand power at all times during operation. This may cause hydraulic steering systems to be especially inefficient. Other considerations for hydraulic systems may include low resolution, multiple components using space, time consuming installation, & frequent maintenance.

Using electric actuators and steer-by-wire controllers in vehicle steering systems may overcome some of the disadvantages of the hydraulic systems. Such electric actuators may be controlled using steer-by-wire controllers connected with the electric actuator. There is a desire to develop sophisticated steer-by-wire systems for use with the electric actuators to provide accurate steering for the vehicles.

SUMMARY

The present disclosure may comprise one or more of the following features and combinations thereof.

According to an aspect of the disclosure, a steer-by-wire control system for use with a material handling vehicle includes a steering assembly and a controller. The steering assembly including steered wheels, a steering wheel, and a linear actuator. The steered wheels are supported on ground underlying the steered wheels. The steered wheels are adapted to turn relative to the ground to set a direction of travel of the material handling vehicle. The steering wheel is configured to rotate about a steering wheel axis. The linear actuator is coupled with the steered wheels and configured to turn the steered wheels relative to the ground.

In some embodiments, the linear actuator includes a ball screw nut, an actuator rod, and a rotation position sensor. The ball screw nut is configured to rotate about an actuator axis to cause the actuator rod to translate axially relative to the actuator axis. The actuator rod is configured to turn the steered wheels in response to the actuator rod translating axially. The rotation position sensor is configured to generate data indicative of an angular position of the ball screw nut relative to the actuator axis.

The controller is connected with the steering wheel and the linear actuator and configured to cause the actuator rod to translate in response to rotation of the steering wheel according to a lock-to-lock ratio between the linear actuator and the steering wheel to vary an angle of the steered wheels. The controller may be programmed to receive data indicative of the angular position of the ball screw nut from the rotation position sensor, determine a linear position of the actuator rod relative to the actuator axis based on the data indicative of the angular position of the ball screw nut, determine a target steering wheel position of the steering wheel relative to the steering wheel axis based on the linear position of the actuator rod, receive data indicative of a measured steering wheel position of the steering wheel relative to the steering wheel axis, compare the measured steering wheel position and the target steering wheel position, and vary the lock-to-lock ratio based on the comparison between the measured steering wheel position and the target steering wheel position to cause a difference between the measured steering wheel position and the target steering wheel position to be reduced in response to the steering wheel being rotated about the steering wheel axis.

In some embodiments, the steer-by-wire control system includes a steered wheel angle sensor configured to measure an angle of the steered wheels. The controller may be programmed to determine the linear position of the actuator rod relative to the actuator axis based on the data indicative of the position of the ball screw nut and the angle of the steered wheels as measured upon startup of the controller. In some embodiments, the lock-to-lock ratio is defined by an amount of rotation of the steering wheel to an amount of axial translation of the actuator rod.

In some embodiments, the controller is programmed to vary the lock-to-lock ratio in response to the difference between the measured steering wheel position and the target steering wheel position being greater than a preset value. In some embodiments, the preset value is zero.

In some embodiments, the controller is programmed to vary the lock-to-lock ratio between a set minimum ratio and a set maximum ratio. The set minimum ratio and the set maximum ratio may be based on percentages of a default lock-to-lock ratio.

In some embodiments, the controller is programmed to decrease the lock-to-lock ratio in response to the steering wheel being rotated about the steering wheel axis away from the target steering wheel position. In some embodiments, the controller is programmed to increase the lock-to-lock ratio in response to the steering wheel being rotated about the steering wheel axis toward the target steering wheel position. In some embodiments, the controller is programmed to continuously vary the lock-to-lock ratio based on comparisons between measured steering wheel positions and target steering wheel positions for all speeds of the steered wheels and for all turn positions of the steered wheels.

According to another aspect of the disclosure, a steer-by-wire control system includes a steering assembly and a controller. The steering assembly includes a steered wheel, a steering wheel configured to rotate about a steering wheel axis, and an actuator coupled with the steered wheel. The actuator is configured to change a direction of the steered wheel in response to rotation of the steering wheel about the steering wheel axis. The controller is connected with the actuator and configured to cause the actuator to move between a plurality of positions in response to rotation of the steering wheel according to a lock-to-lock ratio between the actuator and the steering wheel.

The controller is programmed to determine a target steering wheel position of the steering wheel relative to the steering wheel axis based on a measured position of the actuator, receive data indicative of a measured steering wheel position of the steering wheel relative to the steering wheel axis, and vary the lock-to-lock ratio based on a difference between the target steering wheel position and the measured steering wheel position.

In some embodiments, the actuator includes a ball screw nut, an actuator rod, and a rotation position sensor. The ball screw nut is configured to rotate about an actuator axis to cause the actuator rod to translate axially relative to the actuator axis. The actuator rod is configured to turn the steered wheel in response to the actuator rod translating axially. The rotation position sensor is configured to generate data indicative of an angular position of the ball screw nut relative to the actuator axis. In some embodiments, the measured position of the actuator is based on the data indicative of the angular position of the ball screw nut.

In some embodiments, the steer-by-wire control system includes a steered wheel angle sensor configured to generate data indicative of a measured angle of the steered wheel. The measured position of the actuator may be based on the data indicative of the measured angle of the steered wheels and the data indicative of the angular position of the ball screw nut from the rotational position sensor.

In some embodiments, varying the lock-to-lock ratio is performed in response to a difference between the measured steering wheel position and the target steering wheel position being greater than a preset value. In some embodiments, the preset value is zero. In some embodiments, the target steering wheel position of the steering wheel relative to the steering wheel axis and the measured position of the actuator have a linear relationship.

According to another aspect of the present disclosure, a method of operating a steer-by-wire control system includes a number of steps. The method includes moving an actuator between a plurality of positions in response to rotation of a steering wheel about a steering wheel axis according to a lock-to-lock ratio to cause the actuator to turn a steered wheel, determining a position of the actuator, determining a target steering wheel position of the steering wheel relative to the steering wheel axis based on the position of the actuator, measuring a measured position of the steering wheel, and varying the lock-to-lock ratio based on the target steering wheel position and the measured position of the steering wheel.

In some embodiments, the actuator includes a ball screw nut, an actuator rod, and a rotation position sensor. The ball screw nut is configured to rotate about an actuator axis to cause the actuator rod to translate axially relative to the actuator axis. The actuator rod is configured to turn the steered wheel in response to the actuator rod translating axially. The rotation position sensor is configured to generate data indicative of an angular position of the ball screw nut relative to the actuator axis.

In some embodiments, determining the position of the actuator is based on the data indicative of the angular position of the ball screw nut relative to the actuator axis. In some embodiments, the step of determining the position of the actuator may be based on the data indicative of the angular position of the ball screw nut relative to the actuator axis and on data indicative of a measured angle of the steered wheel.

These and other features of the present disclosure will become more apparent from the following description of the illustrative embodiments.

DETAILED DESCRIPTION OF THE DRAWINGS

Figure 1:
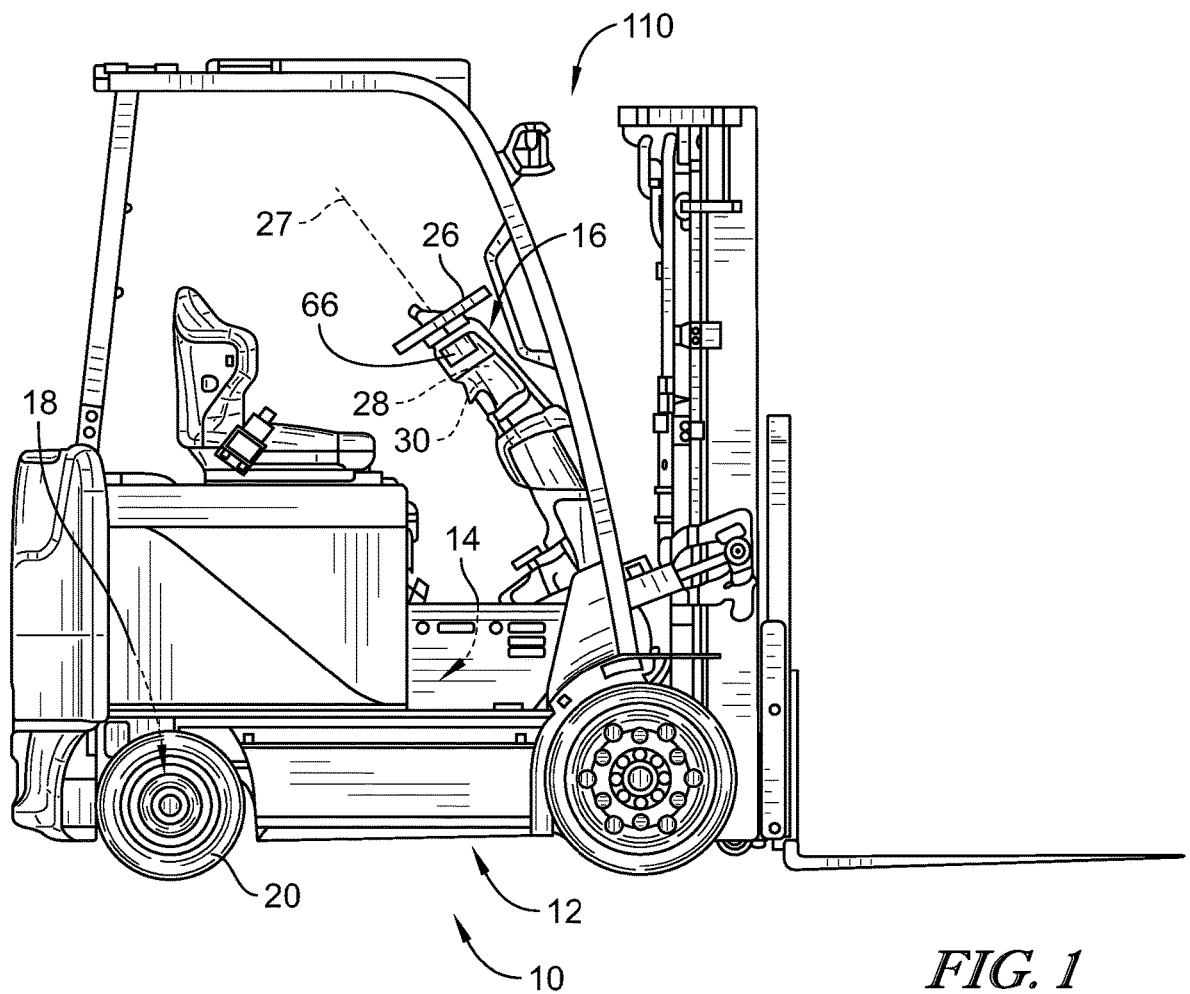
FIG. 1 is elevation side view of a material handling vehicle having a steer-by-wire control system according to the present disclosure.

For the purposes of promoting an understanding of the principles of the disclosure, reference will now be made to a number of illustrative embodiments illustrated in the drawings and specific language will be used to describe the same.

A steer-by-wire control system 10 in accordance with the present disclosure is integrated into a material handling vehicle 110 such as a forklift as shown in FIG. 1. The steer-by-wire control system 10 is configured to control a turning angle of steered wheels 20 of the vehicle 110 based on input from a steering wheel 26 to maintain a desired relationship between the angle of the steered wheels 20 and the position of the steering wheel 26.

Figure 2:
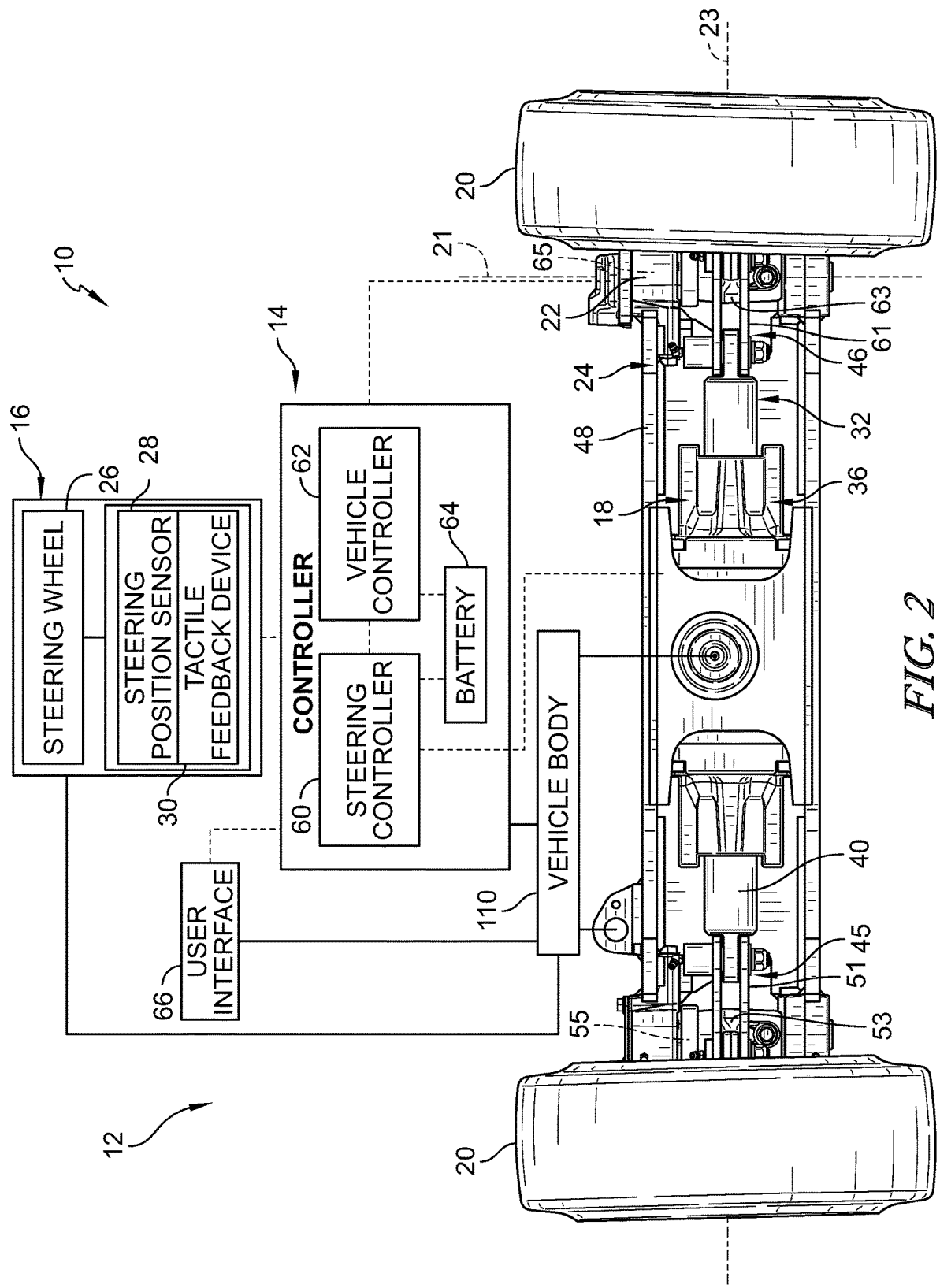
FIG. 2 is a diagrammatic view of the steer-by-wire control system showing that the system includes a steering assembly having steered wheels for moving the vehicle, an actuator mounted to a vehicle body and configured to turn the steered wheels, and a steering wheel for selecting a direction of the steered wheels, and a controller for adjusting a default lock-to-lock ratio between the steering wheel and the actuator to synchronize the actual steering wheel position with a target steering wheel position expected by the system.

The steer-by-wire control system 10 includes a steering assembly 12 and a controller 14 as shown in FIG. 2. The steering assembly 12 includes a steering wheel assembly 16, an actuator 18, and the steered wheels 20. The steering wheel assembly 16 is connected with the controller 14 and includes the steering wheel 26. The actuator 18 is coupled with the steered wheels 20 and connected with the controller 14 to change a direction of the steered wheels 20 in response to rotation of the steering wheel 26 about a steering wheel axis 27 according to a variable lock-to-lock ratio between the steering wheel 26 and the actuator 18. The lock-to-lock ratio is an amount of rotation of the steering wheel 26 to an amount of axial translation of an actuator rod 40 included in the actuator 18.

The controller 14 is configured to synchronize the measured position 50 of the steering wheel 26 (the actual physical position) with a calculated target position 52 of the steering wheel 26 by changing the variable lock-to-lock ratio between the steering wheel 26 and the actuator 18 relative to a default lock-to-lock ratio. As a result, the difference between the measured position 50 of the steering wheel 26 and the target position 52 of the steering wheel 26 is minimized. Maintaining synchronization of the measured position 50 of the steering wheel 26 with the steered wheels 20 may improve control of the material handling vehicle 110 by its operator. The operator may rely on the position of the steering wheel 26 and allow it to inform them of the direction of the steered wheels 20. For example, the operator may assume the steered wheels 20 are centered when the steering wheel 26 is centered.

In the illustrative embodiment, the controller 14 is configured to determine a target steering wheel position of the steering wheel 26 relative to the steering wheel axis 27 based on a position of the actuator 18. The controller 14 varies the lock-to-lock ratio relative to the default lock-to-lock ratio based on a difference between the target steering wheel position and a measured actual steering wheel position. The lock-to-lock ratio is varied temporarily to synchronize the steering wheel 26; however, the lock-to-lock ratio may be varied temporarily relative to the default lock-to-lock ratio on a continuous assessment cycle. In other words, the lock-to-lock ratio may be changed periodically or constantly, but each change is for a temporary amount of time and is implemented relative to the default lock-to-lock ratio.

Varying the lock-to-lock ratio relative to the default lock-to-lock ratio changes the amount of movement of the actuator 18 for a given rotation of the steering wheel 26. As a result, the steered wheels 20 turn more or less than a default amount in response to the given steering wheel 26 rotation which causes one of the actual steering wheel position and the target steering wheel position to move toward the other as the operator continues to rotate the steering wheel 26 and maintain synchronization of the measured position 50 with the target position 52 of the steering wheel 26.

As shown in FIG. 2, the steering assembly 12 includes the steering wheel assembly 16, the actuator 18, the steered wheels 20, and a tire angle sensor 22 that cooperate to vary a direction of travel of the vehicle 110. The steering wheel assembly 16 is connected with the controller 14 to control the actuator 18. The steered wheels 20 are supported on ground underlying the material handling vehicle 110 and are adapted to turn relative to the ground to set a direction of travel of the material handling vehicle 110. The actuator 18 is connected with the controller 14 and coupled with the steered wheels 20 to turn the steered wheels 20 relative to the ground in response to steering wheel inputs received from the controller 14. The tire angle sensor 22 is configured to generate signals indicative of a measured angle of at least one steered wheel 20. The signals generated by the tire angle sensor 22 are illustratively used to establish an initial position of the actuator 18 upon startup of the controller 14.

The steering wheel assembly 16 includes the steering wheel 26, a steering position sensor 28, and a tactile feedback device 30 as shown in FIG. 2. The steering wheel 26 is configured to direct the travel path of the vehicle 110 by means of the steered wheels 20. The steering wheel position sensor 28 is connected with the controller 14 and is configured to detect a position of the steering wheel 26 relative to the steering wheel axis 27. The steering wheel position sensor 28 generates a signal indicative of the position of the steering wheel 26 usable by the controller 14 to adjust the actuator 18 and, thus, adjust an angle of the steered wheels 20. The tactile feedback device 30 may be optional in some embodiments and is configured to apply a resistance force to the steering wheel 26 to resist movement of the steering wheel 26 and provide feedback to the operator.

Illustratively, the steering wheel position sensor 28 is an encoder configured to detect a rotational position of the steering wheel 26. In the illustrative embodiment, the steering wheel position sensor 28 is integrated with the tactile feedback device 30. In other embodiments, the steering wheel position sensor 28 is integrated with the steering wheel 26.

Figure 3:
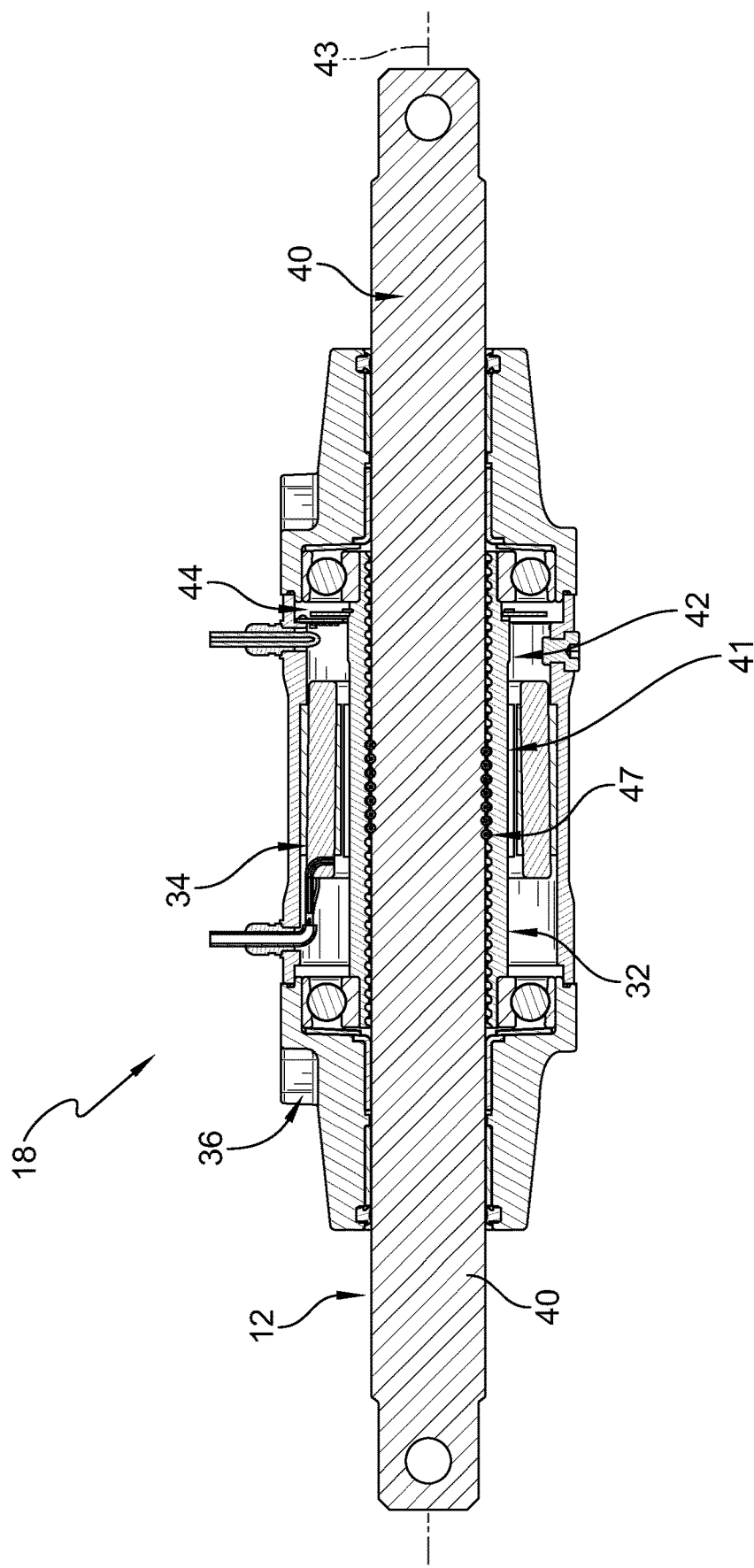
FIG. 3 is a section view of the actuator of FIG. 2 showing that the actuator includes a ball screw nut coupled with an electric motor, an actuator rod, and a rotational position sensor configured to determine an angular position of the ball screw nut which is used by the system's controller to determine a position of the steered wheels and a target position of the steering wheel.
Figure 4:
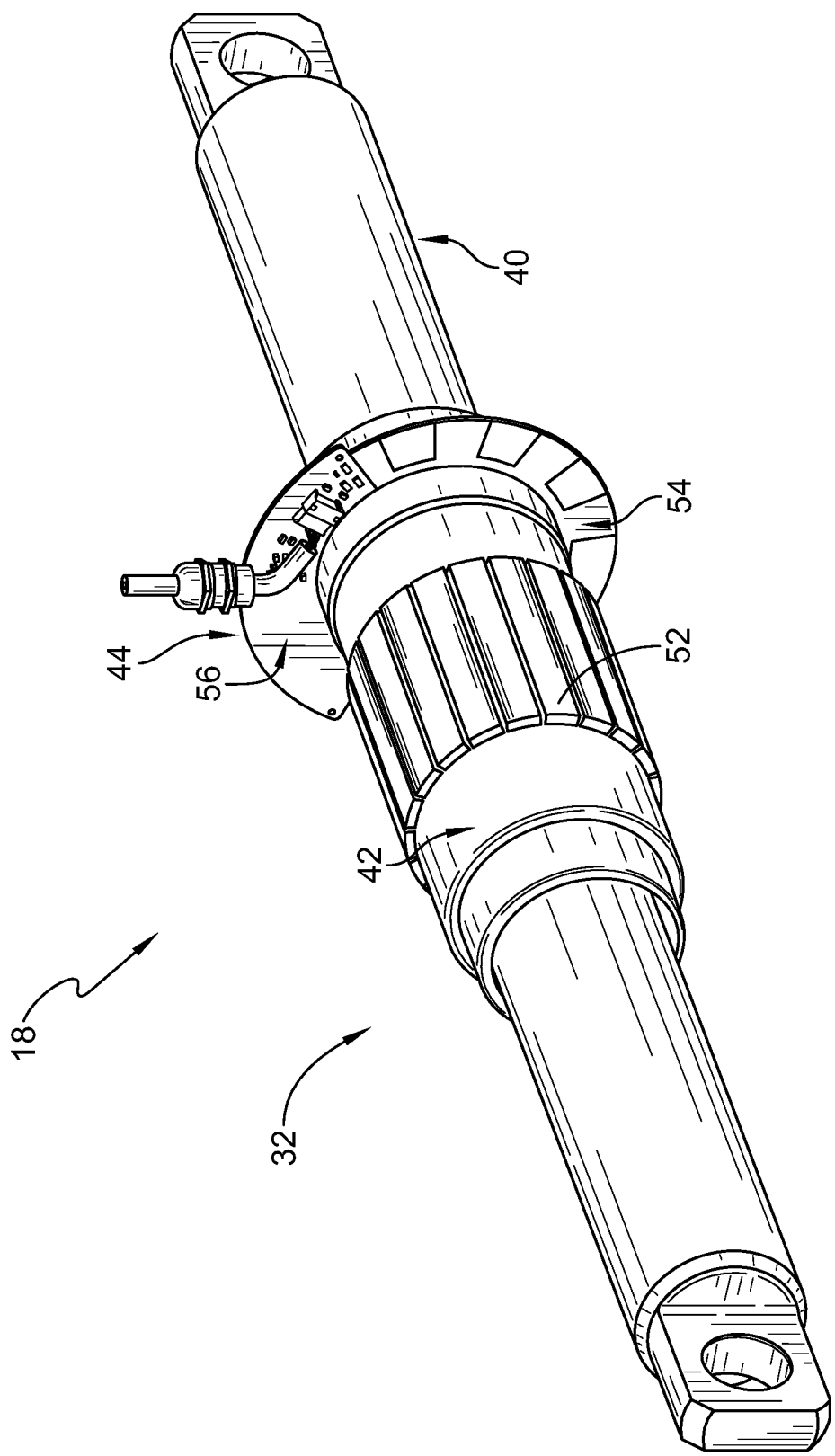
FIG. 4 is a perspective view of components of the actuator of FIG. 3 showing the actuator rod, the ball screw nut arranged around the actuator rod, magnets of the electric motor coupled with the ball screw nut, and the rotational position sensor arranged around the ball screw nut.

The actuator 18 is an electric actuator as shown in FIGS. 2-4. Reference is hereby made to U.S. application Ser. No. 17/703,395, filed 24 Mar. 2022 and titled ELECTRIC ACTUATOR STEERING SYSTEM FOR FORKLIFTS which issued as U.S. Pat. No. 11,685,427 on 27 Jun. 2023 for disclosure relating to the actuator 18 in accordance with the present disclosure, such application is hereby incorporated by reference in its entirety herein.

The actuator 18 includes a linear actuation unit 32, an electric motor 34, and a housing assembly 36 as shown in FIGS. 3 and 4. The linear actuation unit 32 is coupled with the steered wheels 20 and is configured to translate relative to an actuator axis 43 and the housing assembly 36 to cause a change in the angle of the steered wheels 20 in response to an input from the controller 14 based on rotation of the steering wheel 26. The electric motor 34 is coupled to the linear actuation unit 32 and the controller 14 and configured to rotate selectively to cause the linear actuation unit 32 to translate in response to power being supplied to the electric motor 34. The housing assembly 36 is arranged around the electric motor 34 and includes a casing, seals, bearings, etc. to assist in the movement of the linear actuation unit 32.

The steer-by-wire control system 10 further includes an actuator mount assembly 24 that couples the actuator 18 to the vehicle 110 and the steered wheels 20 as shown in FIG. 2. The actuator mount assembly 24 includes tie rod assemblies 45, 46 and a mount 48. The electric actuator 18 is connected to the steered wheels 20 via tie rod assemblies 45, 46 that are coupled to the mount 48. The mount 48 is coupled to the body of the vehicle 110 for movement with the vehicle 110.

Figure 5:
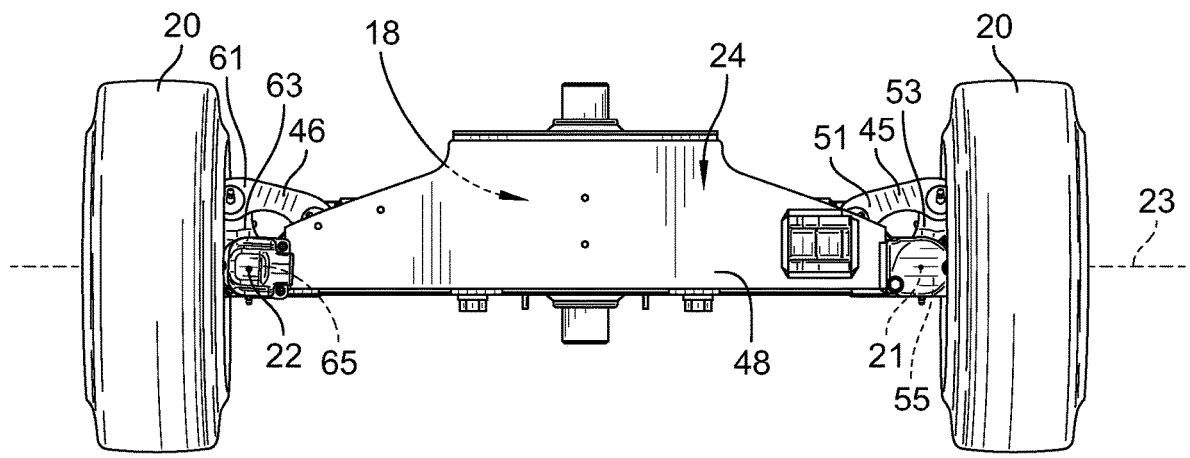
FIG. 5 is a top view of the steering assembly of FIG. 2 showing the steered wheels in a center position and the actuator rod in a zero-stroke position such that the steered wheels direct the vehicle in a straight path.

The tie rod assembly 45 includes a tie rod 51, a steering knuckle 53, and a kingpin 55 and the tie rod assembly 46 includes a tie rod 61, a steering knuckle 63, and a kingpin 65 as shown in FIGS. 2 and 5. The tie rods 51, 61 are coupled with the actuator rod 40 and the respective steering knuckle 53, 63. The steering knuckles 53, 63 are coupled with the steered wheels 20 and the kingpins 55, 65. The steering knuckles 53, 63 are supported by the mount 48.

The linear actuation unit 32 of the actuator 18 includes an actuator rod 40, a rotor 41 configured to rotate about the actuator axis 43 to cause the actuator rod 40 to move, and a rotation position sensor 44 as suggested in FIGS. 3 and 4. Illustratively, the rotor 41 includes a ball screw nut 42 and a plurality of balls 47. The actuator rod 40 extends along the axis 43 between a first end and a second end of the actuator rod 40. The first end and the second end of the actuator rod 40 are coupled with the tie rod assemblies 45, 46 and configured to move the tie rod assemblies 45, 46 to change the angle of the steered wheels 20 in response to translation of the actuator rod 40. The ball screw nut 42 is arranged circumferentially around the actuator rod 40 and configured to convert rotation of the ball screw nut 42 into linear translation of the actuator rod 40. The plurality of balls 47 are located radially between the actuator rod 40 and the ball screw nut 42 and transmit forces from the ball screw nut 42 to the actuator rod 40 to move the actuator rod 40.

The rotation position sensor 44 is coupled with the ball screw nut 42 and the housing assembly 36 as shown in FIGS. 3 and 4. The rotation position sensor 44 is configured to determine a rotational position of the ball screw nut 42 relative to the axis 43 to allow the controller 14 to calculate an axial location of the actuator rod 40 relative to the housing assembly 36 or electric motor 34. The rotation position sensor 44 is configured to generate data indicative of an angular position of the ball screw nut 42 relative to the actuator axis 43. The controller 14 may further use data from the tire angle sensor 22, such as an actual position of one of the steered wheels 20 at the time of controller 14 startup, in the calculation of or initial calculation of the axial location of the actuator rod 40.

The rotation position sensor 44 includes a position target board 54 and an arcuate sensor board 56 as shown in FIG. 4. The position target board 54 extends fully around the axis 43 in the illustrative embodiment and is coupled with the ball screw nut 42 for rotation with the ball screw nut 42. The arcuate sensor board 56 is located axially near or adjacent the position target board 54 and is fixed with the housing assembly 36. The arcuate sensor board 56 illustratively extends only partway around the axis 43 in the illustrative embodiment.

The position target board 54 includes a plurality of conductive targets on its body as shown in FIG. 4. The targets are spaced apart from one another circumferentially.

The arcuate sensor board 56 is located axially adjacent the position target board 54 and is configured to detect the conductive targets on the position target board 54 as they move circumferentially during rotation of the ball screw nut 42. The arcuate sensor board 56 is connected with the controller 14 and configured to transmit data indicative of the rotational position of the ball screw nut 42 to the controller 14 based on the location and/or movement of the conductive targets.

In illustrative embodiments, the rotation position sensor 44 is configured to generate an angular position signal that is indicative of the angular position of the ball screw nut 42 relative to the axis 43. As a result, the signal from the rotation position sensor 44 is used to provide relative movement information of the actuator rod 40 in the illustrative embodiment as compared to absolute movement information.

As an example, the ball screw nut 42 can be in the same angular position for a number of different axial positions of the actuator rod 40 and, thus, for a number of different steered wheel 20 angles. For example, if the ball screw nut 42 starts at a zero (0) degree position, the actuator rod 40 will be at a first linear position. Rotating the ball screw nut 42 by 360 degrees will cause the actuator rod 40 to translate into a second linear position; however, the ball screw nut 42 will again be at the zero (0) degree position as read by the rotation position sensor 44. The amount of rotation (360 degrees) detected by the rotation position sensor 44 can be used to determine an amount of relative linear movement of the actuator rod 40. Even still, the rotation position sensor 44 provides information of the relative movement of the ball screw nut 42 and the actuator rod 40, but not the absolute position of the actuator rod 40 in the illustrative embodiment.

The tire angle sensor 22 is used with the rotation position sensor 44 to determine and track the absolute position of the actuator rod 40. The tire angle sensor 22 is configured to measure the angle of the steered wheels 20 and generate a tire angle signal indicative of the measured angle of the steered wheels 20. On startup, the controller 14 captures the actual angle of at least one steered wheel 20 from the tire angle sensor 22. The controller 14 uses the data from the tire angle sensor 22 and, optionally the data from the rotation position sensor 44, to determine and assign an initial position of the actuator rod 40 at startup. After startup, the controller 14 determines the position of the actuator rod 40 using the data from the rotation position sensor 44 to determine the relative change in position from that initial position at startup. In other words, after startup, the controller 14 counts the rotations and/or angles of rotation of the ball screw nut 42 based on the rotation position sensor 44 and determines an amount of relative movement of the actuator rod 40 and, thus, a relative angle change of the steered wheels 20 relative to the startup angle of the steered wheels 20.

The tire angle sensor 22 is coupled with the steering knuckle 63 included in the tie rod assembly 46 in the illustrative embodiment as shown in FIG. 2. The tire angle sensor includes a potentiometer configured to measure an angle of the king pin 65 included in the tie rod assembly 46 and, thus, measure an angle of the steered wheels 20. In other embodiments, other suitable measurements may be used to determine the angle of the steered wheels 20. In other embodiments, other sensors and sensor locations are used to measure the angle of the steered wheels 20. The tire angle sensor 22 is connected with the controller 14 to transmit the tire angle signal to the controller 14. Illustratively, the tire angle sensor 22 is configured to transmit the tire angle signal to the vehicle controller 62 and the vehicle controller 62 transmits the data to the steering controller 60.

Illustratively, the tire angle sensor 22 includes a spring loaded potentiometer. The tire angle sensor 22 is powered by a regulated voltage supply and will output a voltage signal in which each degree of change results in a corresponding voltage change. The voltage change is a linear relationship to angle change in the illustrative embodiment.

The steered wheels 20 are coupled to the actuator 18 and are each configured to rotate about a first axis 21 (measured by angle change) to change a direction of travel of the vehicle 110 as suggested in FIG. 5. The steered wheels 20 are further configured to rotate (measured by revolutions per minute, RPM) about a second axis 23 to cause the vehicle 110 to be propelled relative to ground underlying the vehicle 110.

The steered wheels 20 have a center position in which the steered wheels direct the vehicle 110 in a straight path as shown in FIG. 5. The steering wheel 26 is in a centered position when the steered wheels 20 are centered as suggested in FIG. 6. The centered position of the steering wheel 26 can be determined by features on the steering wheel 26 such as, for example, buttons, support struts, wheel handle orientation, and/or a steering knob on the wheel. The steered wheels 20 are configured to turn in either direction away from the center position up to a maximum turn position to turn the vehicle 110. The actuator 18 has a zero-stroke position in which the actuator rod 40 is generally centered in its range of movement as suggested in FIGS. 3 and 5. The actuator 18, tie rods 45, 46, and steered wheels 20 are configured such that the steered wheels 20 are in the center position in response to the actuator 18 being in the zero-stroke position.

Figure 7:
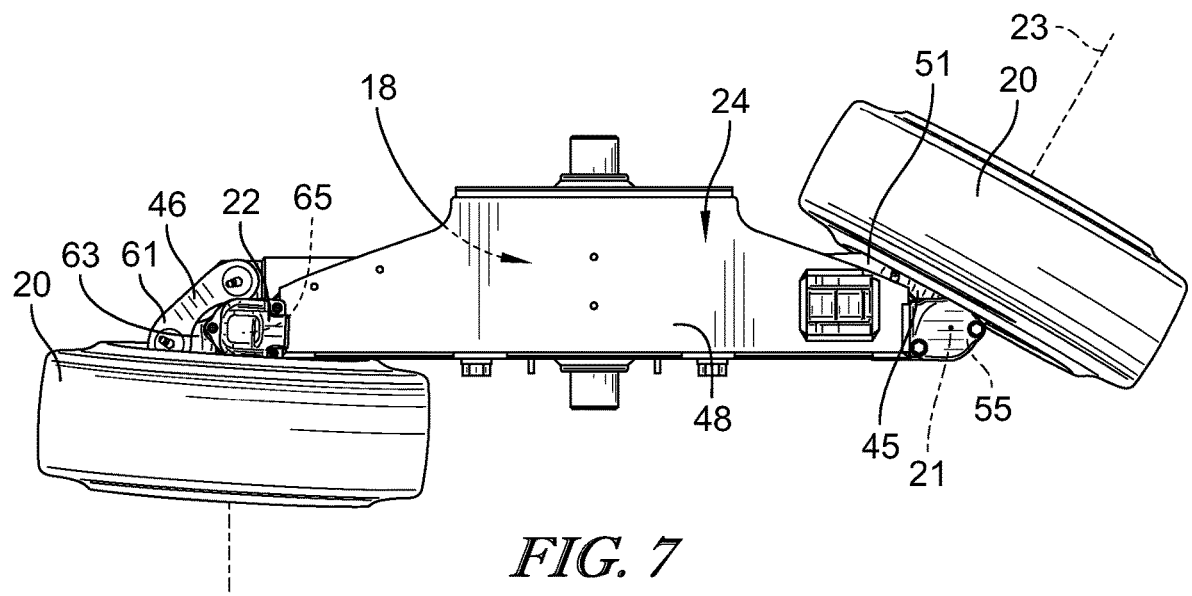
FIG. 7 is a top view of the steering assembly of FIG. 2 showing the steered wheels in a maximum turn angle position and the actuator rod in a fully stroked position in which the actuator rod is stopped from further movement by the controller, the maximum turn angle position corresponding with the steered wheels directing the vehicle in a minimum turn curved path.

The steered wheels 20 further have a maximum turn angle in which the controller 14 stops further turning angle of the steered wheels 20 as shown in FIG. 7. The steered wheels 20 are configured to turn to any number of angles between the centered position and the left and right maximum turn angles as suggested in FIG. 9. The actuator rod 40 is at its maximum stroke length in one direction when the steered wheels 20 are in the corresponding maximum turn angle. The steering wheel 26 is free to be further rotated about the steering wheel axis 27 when the steered wheels 20 are in the maximum turn angle. Though, the steering wheel 26 is further rotated, the controller 14 stops the steered wheels 20 from turning beyond the preset maximum turn angle.

The controller 14 will turn the steered wheels 20 away from the maximum turn angle and back toward the centered position in response to the steering wheel 26 being rotated in the opposite direction. As discussed below, the steered wheels 20 will immediately begin to turn back to center in response to the steering wheel 26 being turned, but the lock-to-lock ratio will be varied relative to the default ratio to sync the position of the steering wheel 26 with the target steering wheel position since they were offset due to the steering wheel 26 being rotated beyond the position corresponding with the steered wheels maximum turn angle.

The controller 14 is configured to receive the data from the steering wheel position sensor 28, rotational position sensor 46, and, at startup, the tire angle sensor 22 to vary the position of the actuator 18 and change an angle of the steered wheels 20 while maintaining synchronization between the steering wheel 26 and its target position 52. The controller 14 illustratively includes the steering controller 60, a vehicle controller 62, a battery 64, and a user interface 66 as shown in FIG. 2. The steering controller 60 is configured to control the steered wheels 20 based on input received from the steering wheel assembly 16 and the vehicle controller 62. The vehicle controller 62 controls other aspects of the vehicle 110 and receives data from the tire angle sensor 22. Among other uses of the tire position sensor data, the vehicle controller 62 transmits the tire position sensor data to the steering controller 60. The battery 64 is electrically connected to the steering controller 60 and the vehicle controller 62.

The steering controller 60 is configured to regulate the flow of electric energy from the battery 64 to the electric motor 34 of the actuator 18 for powering movement of the electric actuator 18. Electrical connections are depicted as broken lines in FIG. 2. Each of the steering controller 60 and the vehicle controller 62 include a memory and a processor configured to execute instructions stored on the memory. In other embodiments, the controller 14 may include a single processor and memory instead of the two controllers 60, 62. The user interface 66 is adapted to receive input from the vehicle operator or manufacturer to activate, deactivate, and vary features of the system 10, among other things.

At start up, the controller 14 is configured to determine a calculated linear position of the actuator rod 40 relative to the ball screw nut 42 based on the tire angle signal received from the tire angle sensor 22. As an example, the tire angle sensor 22 may generate a signal indicating the steered wheels 20 are turned to 20 degrees and the controller 14 calculates the linear position of the actuator rod 40 based on the angle of the steered wheels. In some embodiments, calculating the linear position of the actuator rod 40 is performed by using a mathematical function or interpolating the position based on the tire angle signal by using a look up table of actuator rod positions and tire angle signal data stored on the memory.

The calculated linear position of the actuator rod 40 can then be used with the signal from the rotational position sensor 44 to relate the actuator rod 40 linear position with the angular rotational position of the ball screw nut 42 at the time of startup. The controller 14 is therefore able to determine a starting or baseline position of the actuator rod 40, rotational position sensor 44, and steered wheels 20 using the signal from the tire angle sensor 22 at start up. It then changes the position of the actuator rod 40 and the angle of the steered wheels 20 in response to input from the steering wheel 26 by rotating the ball screw nut 42. The controller 14 tracks the changing position of the actuator rod 40 and the angle of the steered wheels 20 using the signal from the rotational position sensor 44 and measuring the rotation of the ball screw nut 42. The controller 14 stops the motor 34 from rotating the ball screw nut 42 beyond the maximum angular limit so that the actuator rod 40 is not over stroked and the steered wheels 20 are stopped from exceeding the maximum turn angle.

In some embodiments, the controller 14 is programmed to periodically or on demand reset the starting or baseline calculated linear position of the actuator rod 40 using the signal from the tire angle sensor 22 during use of the vehicle 110. This may remove any hysteresis or inaccuracies in the system caused by vehicle use, external forces, etc.

During operation, the controller 14 is programmed to receive data indicative of the angular position of the ball screw nut 42 from the rotation position sensor 44. As the ball screw nut 42 is rotated to vary the position of the actuator rod 40, and thus the angle of the steered wheels 20, the relative change in position of the ball screw nut 42 is transmitted by the rotation position sensor 44 to the controller 14. The controller 14 determines a linear position of the actuator rod 40 relative to the actuator axis 43 based on the data indicative of the angular position of the ball screw nut 42.

Based on a gear ratio between the ball screw nut 42 and the actuator rod 40, the controller 14 is programmed to determine the distance the actuator rod 40 translates as the ball screw nut 42 rotates. In the illustrative embodiment, the controller 14 uses the data from the tire angle sensor 22 at startup to provide an initial relationship between the actuator rod 40 and the steered wheels 20. However, after startup, the controller 14 uses only the data from the rotation position sensor 44 to determine the position of the actuator rod 40. In other embodiments, the initial position of the actuator rod 40 could be determined using sensors other than the tire angle sensor 22 and the rotation position sensor 44 could still be used alone after the initial position is determined.

Figure 6:
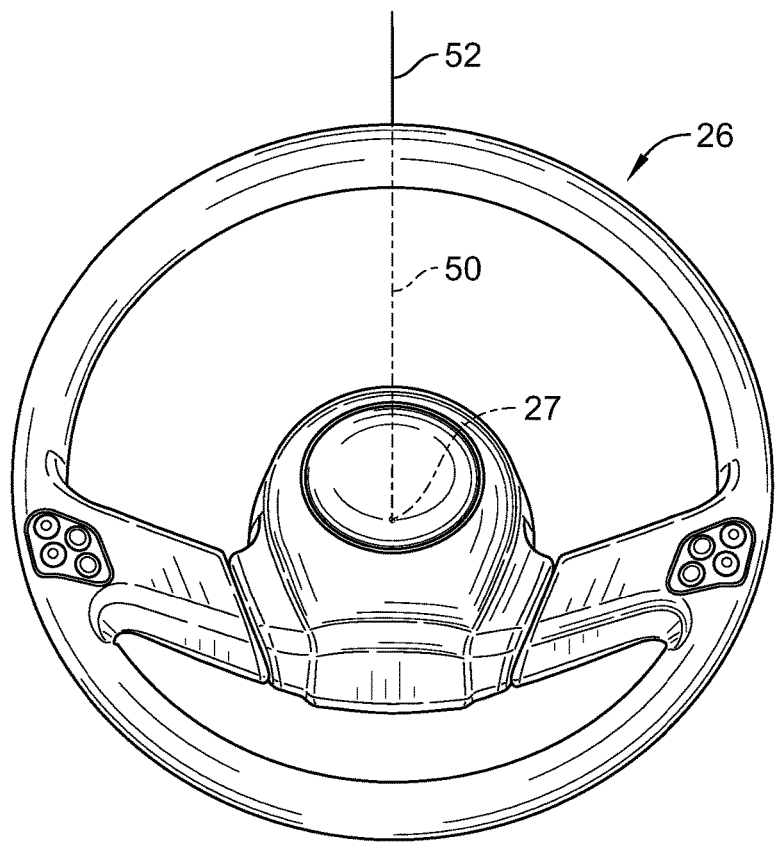
FIG. 6 is a perspective view of the steering wheel of FIG. 2 showing that the steering wheel is configured to be centered when the steered wheels are centered as shown in FIG. 5 and suggesting that the actual measured position of the steering wheel is synced with the target position of the steering wheel.
Figure 8:
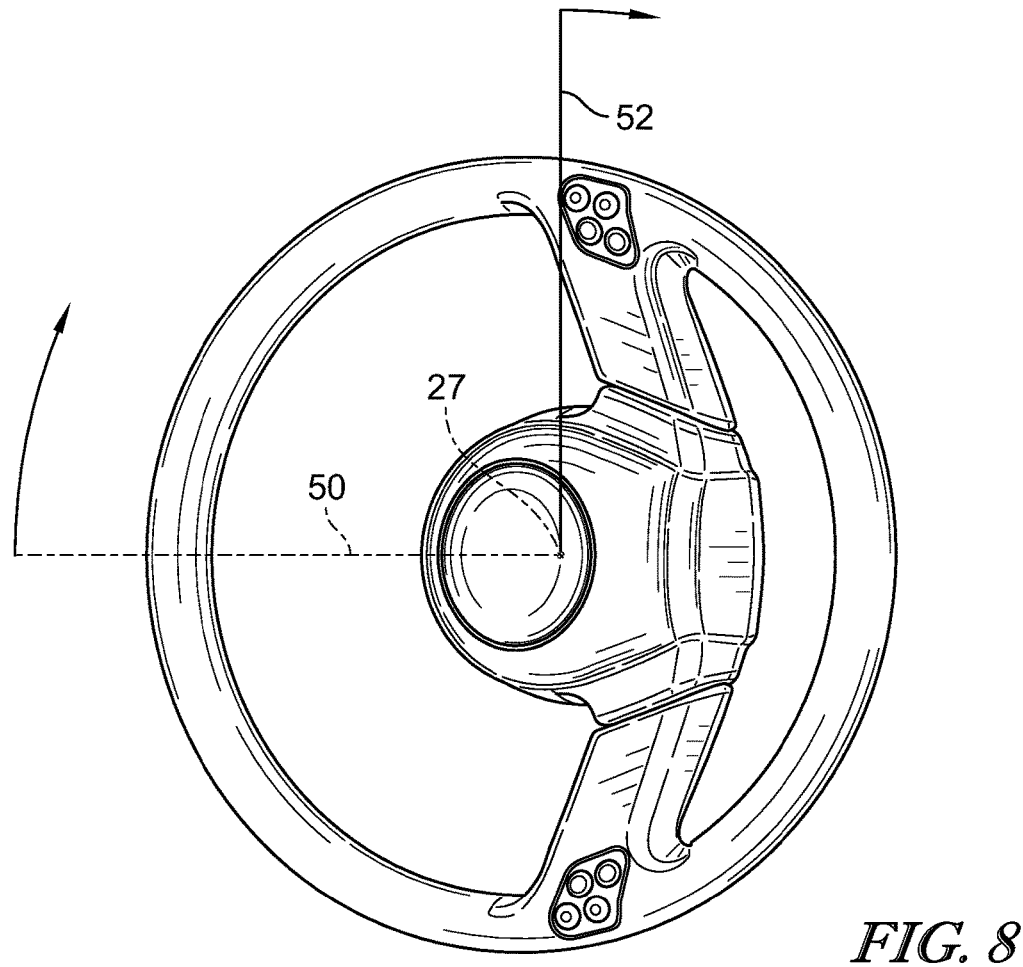
FIG. 8 is a perspective view of the steering wheel of FIG. 2 showing that the steering wheel has been rotated to cause the steered wheels to be in the maximum turn angle shown in FIG. 7 and suggesting that the actual measured position of the steering wheel is out of sync with the target steering wheel position.
Figure 10:
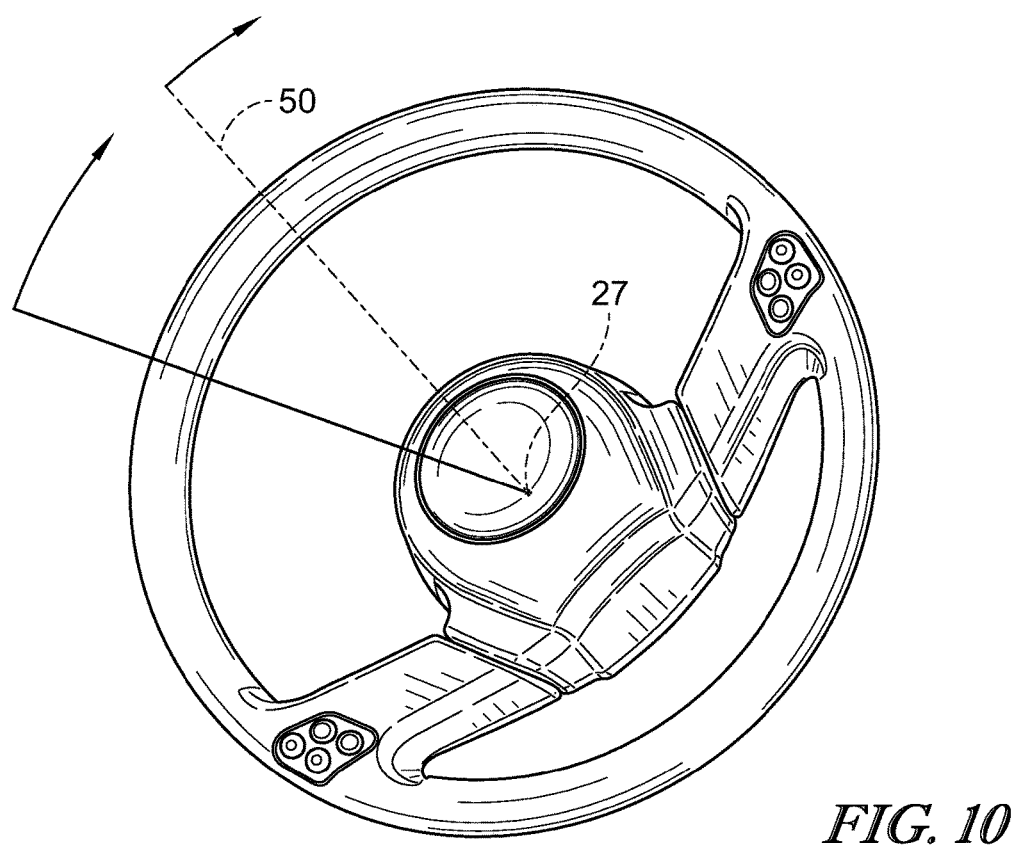
FIG. 10 is a perspective view of the steering wheel of FIG. 2 showing that the steering wheel has been rotated to cause the steered wheels to be in the turn angle position shown in FIG. 9 and suggesting that the actual measured position of the steering wheel is out of sync with the target steering wheel position.

The controller 14 determine a target steering wheel position of the steering wheel 26 relative to the steering wheel axis 27 based on a measured position of the actuator 18. In particular, the controller 14 determines a target steering wheel position of the steering wheel 26 relative to the steering wheel axis 27 based on the linear position of the actuator rod 40. In FIG. 6, the actual measured position 50 of the steering wheel 26 (indicated by line 50) is synced with, and overlaps with, the target steering wheel position (indicated by line 52). In contrast, FIGS. 8 and 10 show examples where the actual measured position 50 of the steering wheel 26 (indicated by line 50) is out of sync with, and offset from, the target steering wheel position (indicated by line 52).

Figure 11:
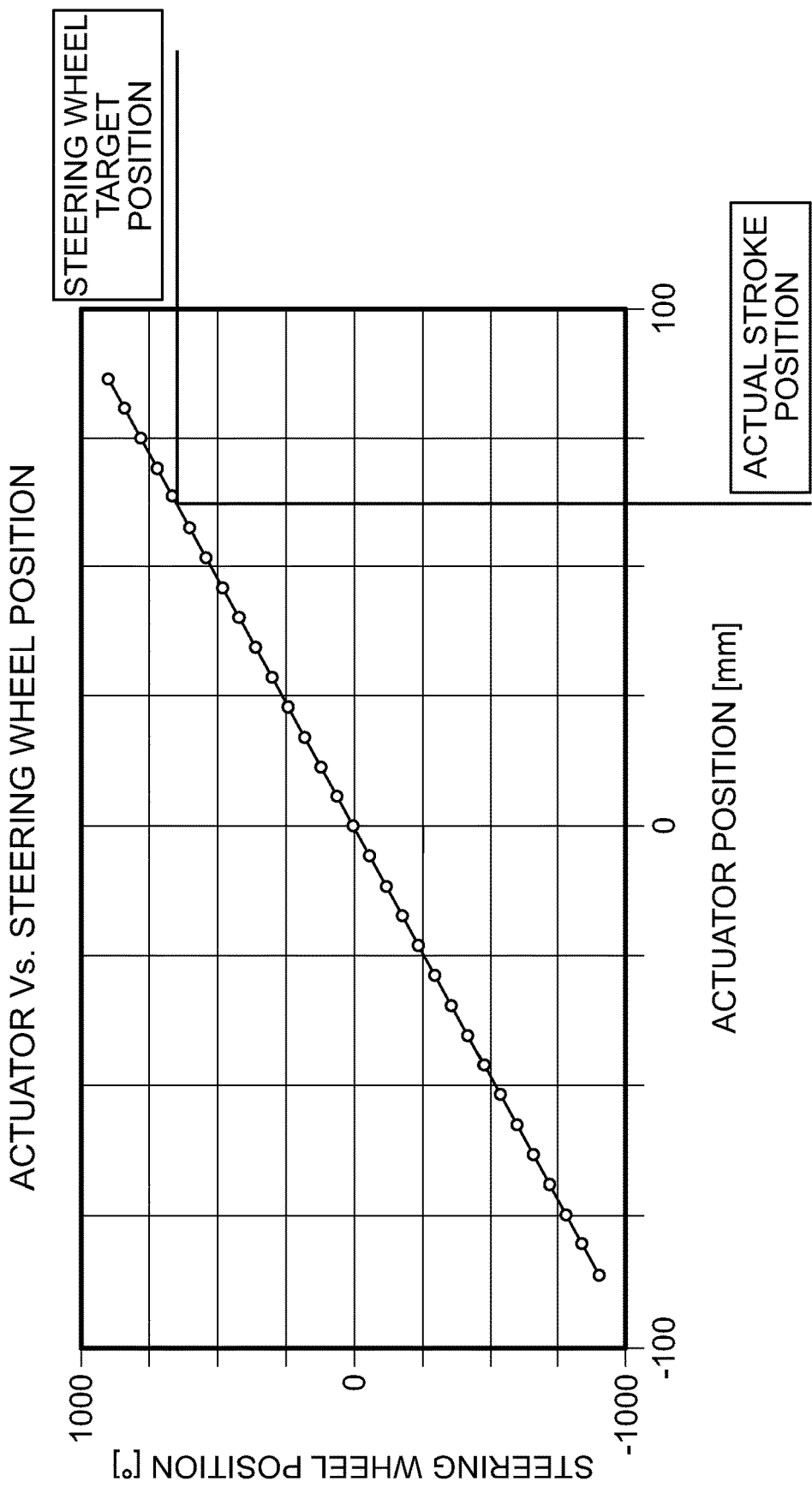
FIG. 11 is a graph showing the correlation between the position of the actuator and the target steering wheel position.

As shown in FIG. 11, the controller 14 is programmed with a correlation between the position of the actuator rod 40 and the position of the steering wheel 26. This correlation may be a calculated function or stored in a look up table and used with interpolation. As shown in FIG. 11, the correlation between the position of the actuator rod 40 and the position of the steering wheel 26 is a linear correlation. Such linear correlation may make programming of the controller 14 and control of the steering of the vehicle 110 easier as compared to using the angle of the steered wheels 20 directly because the relationship between the angle of the steered wheels 20 and the position of the steering wheel 26 is typically not a linear correlation.

As suggested in FIGS. 5, 6, and 11, the steering wheel 26 being centered corresponds with the actuator rod 40 being centered. The actuator rod 40 is configured to move in either direction away from the centered position to its maximum stroke length. In the illustrative embodiment, the steering wheel 26 is configured to rotate through two complete rotations (720 degrees) from the actuator rod 40 being centered (and steered wheels 20) to the maximum stroke length and maximum allowed turn angle of the steered wheels 20. As a result, the illustrative default lock-to-lock ratio between the linear actuator 18 and the steering wheel 26 is 4:1. In other words, four complete rotations of the steering wheel 26 in a first direction about the steering wheel axis 27 cause the actuator rod 40 to move from one maximum stroke length position to the other maximum stroke length position (i.e. max left turn to max right turn). A default lock-to-lock ratio of 4:1 is for illustrative purposes and in other embodiments the default lock-to-lock ratio may be any other suitable ratio.

The controller 14 receives the data indicative of the measured steering wheel position of the steering wheel 26 relative to the steering wheel axis 27 from the steering wheel position sensor 28. As a result, the controller 14 has the actual angular position of the steering wheel 26. The controller 14 then compares the measured steering wheel position with the target steering wheel position which was determined based on the position of the actuator rod 40.

The actual measured position 50 of the steering wheel 26 may not match the target steering wheel position due to a number of factors. As one example, the controller 14 is programmed to not allow further rotation of the ball screw nut 42 to stop further turning of the steered wheels 20 in response to a preset max turn angle being reached by the steered wheels 20 as suggested in FIG. 7. Following our example from above, using a default lock-to-lock ratio of 4:1 would result in two complete rotations of the steering wheel 26 being associated with the maximum turn angle. As such, the target position 52 of the steering wheel 26 is at zero (0) degrees such that the steering wheel 26 should be centered in FIG. 8 as it is in FIG. 6. However, the steering wheel 26 is free to be rotated by the operator even though it will not cause further turning of the steered wheels 20 beyond the maximum turn angle. As a result, the target steering wheel position 52 remains the same (zero degrees) because the actuator rod 40 is not moving, but the actual measured position 50 of the steering wheel 26 continues to move away from the target steering wheel position 52 as shown in FIG. 8.

To maintain synchronization of the actual measured position 50 of the steering wheel 26 with the target steering wheel position 52 of the steering wheel 26, the controller 14 is programmed to vary the lock-to-lock ratio relative to the default lock-to-lock ratio. The controller 14 is programmed to vary the lock-to-lock ratio based on the comparison between the measured steering wheel position and the target steering wheel position to cause a difference between the measured steering wheel position and the target steering wheel position to be reduced in response to the steering wheel 26 being rotated about the steering wheel axis 27.

By temporarily varying the lock-to-lock ratio relative to the default lock-to-lock ratio, any difference between the measured steering wheel position and the target steering wheel position is reduced in response to the steering wheel 26 being rotated about the steering wheel axis 27. Referring again to FIGS. 7 and 8, when the steering wheel 26 is rotated clockwise to turn the steered wheels 20 back toward center, the controller 14 temporarily varies the lock-to-lock ratio away from the default lock-to-lock ratio because of the difference between the measured position 50 and the target position 52. The controller 14 temporarily increases the lock-to-lock ratio relative to the default lock-to-lock ratio such that the measured position 50 of the steering wheel 50 changes more than a change in the target position 52 as suggested by the size of the rotation arrows in FIG. 8. In other words, the steered wheels 20 are turned less than a default amount for a given rotation of the steering wheel 26 so that the target position 52 changes "slower" than the "faster" moving actual steering wheel position 50.

Figure 9:
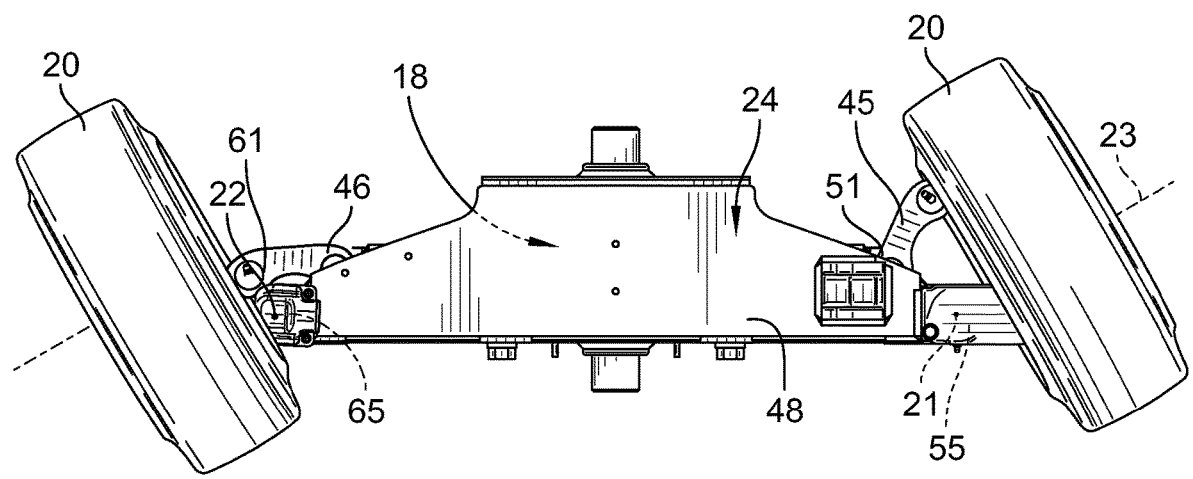
FIG. 9 is a top view of the steering assembly of FIG. 2 showing the steered wheels in a turn angle position that is less than the maximum turn angle position.

In another example, the steered wheels 20 are turned to an angle less than the maximum turning angle in response to rotation of the steering wheel 26 as suggested in FIGS. 9 and 10. Due to resistance on the ground or any other suitable reason, the measured position 50 of the steering wheel 26 is out of sync with the target position 52 as suggested in FIG. 10. In response to this difference, the controller 14 is configured to decrease the lock-to-lock ratio relative to the default lock-to-lock ratio in response to the steering wheel 26 being rotated clockwise toward the centered position of the steered wheels.

As the steering wheel 26 is rotated clockwise, the target position 52 moves a greater amount or "faster" than the measured position 50 of the steering wheel 26 for a given amount of rotation of the steering wheel 26 as suggested by the size of the rotation arrows in FIG. 10. In other words, the steered wheels 20 are turned more than a default amount for a given rotation of the steering wheel 26 so that the target position 52 changes "faster" than actual steering wheel position 50. If the steering wheel 26 was rotated counter-clockwise, the controller 14 would increase the lock-to-lock ratio similar to the example of FIGS. 7 and 8 so that the measured position 50 would catch up with the target position 52 as the steering wheel 26 is rotated.

In the illustrative embodiment, the lock-to-lock ratio is decreased relative to the default lock-to-lock ratio in response to the steering wheel 26 being rotated about the steering wheel axis 27 in a direction away from the target steering wheel position and increased in response to the steering wheel 26 being rotated about the steering wheel axis 27 in a direction toward the target steering wheel position. For example, if the steering wheel 26 is rotated away from the target steering wheel position, the lock-to-lock ratio is decreased, for example to 3.8:1, such that 1.9 complete rotations of the steering wheel 26 moves the actuator rod 40 from its center to one of the maximum stroke length positions.

In the illustrative embodiment, the terms toward and away are relative to 180 degrees. As an example, if the measured steering wheel position is 170 degrees away from the target steering wheel position, rotation of the steering wheel 26 towards 180 degrees away from the target steering wheel position would be rotating away from the target steering wheel position. If the steering wheel 26 is rotated to or beyond 180 degrees from the target steering wheel position, the value restarts at zero degrees and would be considered to be moving toward the target steering wheel position.

In illustrative embodiments, the controller 14 is programmed to vary the lock-to-lock ratio relative to the default ratio in response to the difference between the measured steering wheel position and the target steering wheel position being greater than a preset value. The preset value is zero in some embodiments. As such, the lock-to-lock ratio is varied if there is any difference between the measured steering wheel position and the target steering wheel position. In other embodiments, the preset value may be a non-zero value to allow for some difference between the measured and target positions 50, 52 before the lock-to-lock ratio is varied. In some embodiments, no preset value is used and, instead, the difference between the measured and target position 50, 52 is used or used as a Boolean to determine if and how much to adjust the lock-to-lock ratio.

The controller 14 is programmed to vary the lock-to-lock ratio relative to the default lock-to-lock ratio between a set minimum ratio and a set maximum ratio. In the illustrative embodiment, the set minimum ratio and the set maximum ratio are based on percentages of a default lock-to-lock ratio. For example, the default lock-to-lock ratio is 4:1 and each of the minimum ratio and the maximum ratio may be a set percent of 4:1. If the minimum ratio is set at 4 percent, the minimum lock-to-lock ratio would be 3.84:1. If the maximum ratio is set at 5 percent, the maximum lock-to-lock ratio would be 4.4:1. The controller 14 is programmed to vary the lock-to-lock ratio relative to the default ratio between the minimum and maximum ratios based on a proportional-integral (P.I.) loop such that the lock-to-lock ratio may be any value between and including the minimum and maximum ratio. In other embodiments, the controller 14 uses a finite number for lock-to-lock ratios such as only switching between the minimum ratio, the default lock-to-lock ratio, and the maximum ratio.

Varying the lock-to-lock ratio results in a gradual synchronization of the measured position 50 and the target position 52 as opposed to an instant correction. In some embodiments, the maximum and minimum ratios are set such that the maximum difference between the measured position 50 and the target position 52 (error of approximately 179.99 degrees) is removed and the measured position 50 and the target position 52 would be synced within one complete rotation (360 degrees) or less of the steering wheel 26 so long as no further forces or event affect the synchronization of the positions 50, 52. In some embodiments, the maximum and minimum ratios are set such that the maximum difference between the measured position 50 and the target position 52 (error of approximately 179.99 degrees) is removed and the measured position 50 and the target position 52 would be synced within two complete rotations (360 degrees) or less of the steering wheel 26 so long as no further forces or event affect the synchronization of the positions 50, 52.

The controller 14 is programmed to continuously monitor the difference between the measured and target steering wheel position and continuously vary the lock-to-lock ratio for a temporary amount of time if there is a difference between the values. In some embodiments, the lock-to-lock ratio is varied each occurrence for a set amount of time. In some embodiments, the controller 14 loops the evaluation cycle and varies the lock-to-lock ratio relative to the default ratio by small amounts each loop to continuously correct and sync the steering wheel position. In some steer-by-wire systems, the systems may make decisions or initiate processes in response to tire angle, vehicle speed etc. The controller 14 of the present disclosure compares the measured and target steering wheel positions continuously for all operating conditions including all vehicle speeds and all tire angles of the steered wheels.

Figure 12:
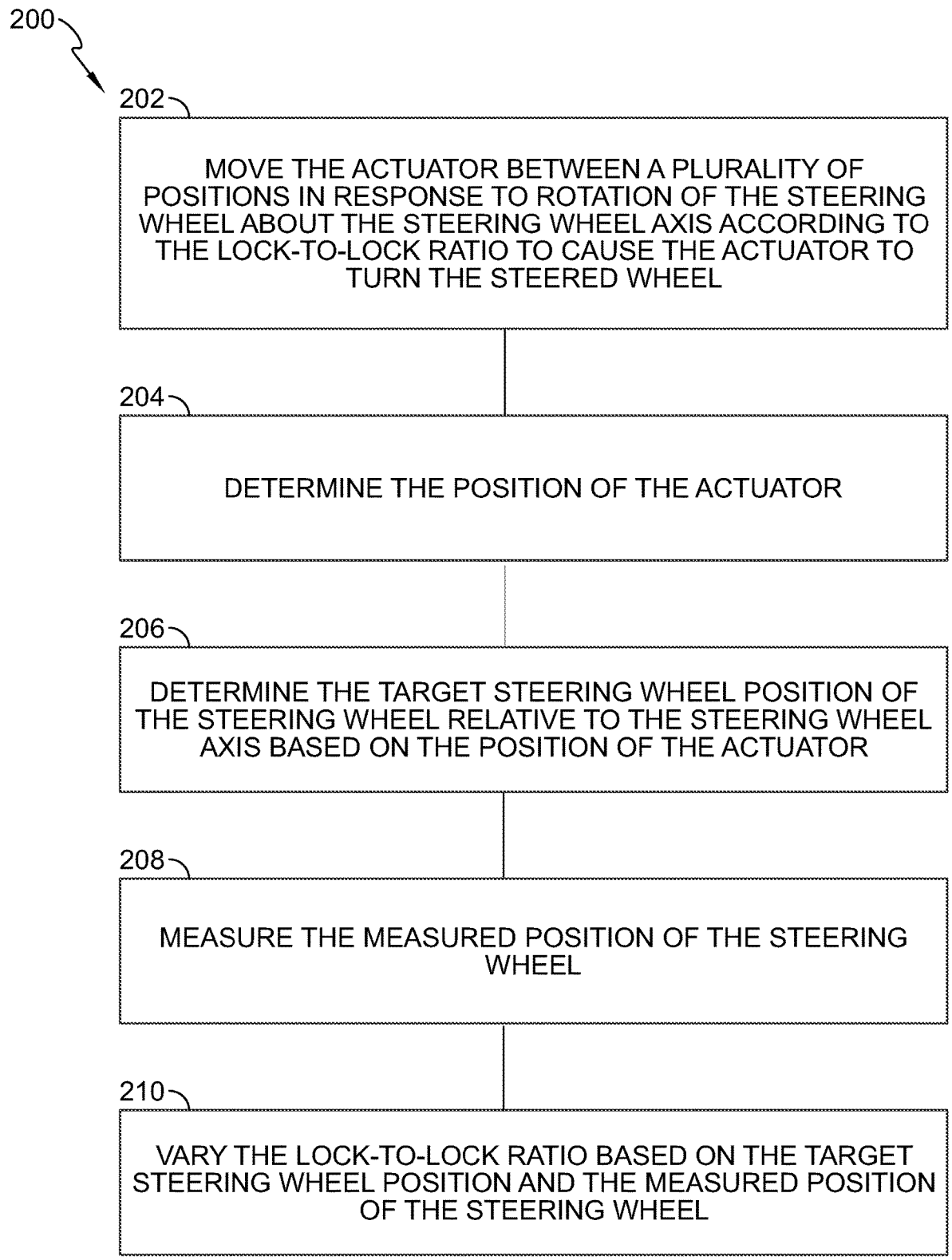
FIG. 12 shows method steps for synchronizing the actual measured position of the steering wheel with the target position of the steering wheel in accordance with the present disclosure.

According to one embodiment, the memory in the controller 14 includes instructions that, when executed by the processor, cause the controller 14 to perform a number of steps as shown in method 200 of FIG. 12. The method 200 may begin at vehicle key on such as when the vehicle is started. The method may begin in response to a manual input to perform the method 200 or any portion of the method 200. The method 200 or any portion of the method 200 may be programmed to be performed automatically by the controller 14 periodically.

At step 202, the method 200 includes moving the actuator 18 between a plurality of positions in response to rotation of the steering wheel 26 about the steering wheel axis 27 according to the default lock-to-lock ratio to cause the actuator 18 to turn the steered wheel 20. In step 204, the position of the actuator 18 is determined. Illustratively, the position of the actuator rod 40 is determined based on the data indicative of the angular position of the ball screw nut 42 relative to the actuator axis 43. In some embodiments, the position of the actuator 18 is based on the data indicative of the angular position of the ball screw nut 42 relative to the actuator axis 43 and on the data indicative of the measured angle of the steered wheel 20, for example, using the angle of the steered wheel 20 as it was measured on startup.

At a step 206, the target steering wheel position of the steering wheel 26 relative to the steering wheel axis 27 is determined based on the position of the actuator 18. The target steering wheel position being determined in the illustrative embodiment using a mathematical formula, function, or look up table providing a correlation between the position of the actuator 18 and the target steering wheel position as suggested in FIG. 12.

At a step 208, the measured position 50 of the steering wheel 26 is measured, for example, using steering position sensor 28. At a step 210, the lock-to-lock ratio is varied relative to the default ratio based on the target steering wheel position and the measured position 50 of the steering wheel. While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A steer-by-wire control system for use with a material handling vehicle, the steer-by-wire control system comprising:
    a steering assembly including:
        steered wheels supported on ground underlying the steered wheels, the steered wheels adapted to turn relative to the ground to set a direction of travel of the material handling vehicle,
        a steering wheel configured to rotate about a steering wheel axis, and
        a linear actuator coupled with the steered wheels and configured to turn the steered wheels relative to the ground, the linear actuator including a ball screw nut, an actuator rod, and a rotation position sensor, the ball screw nut configured to rotate about an actuator axis to cause the actuator rod to translate axially relative to the actuator axis, the actuator rod configured to turn the steered wheels in response to the actuator rod translating axially, and the rotation position sensor configured to generate data indicative of an angular position of the ball screw nut relative to the actuator axis, and
    a controller connected with the steering wheel and the linear actuator and configured to cause the actuator rod to translate in response to rotation of the steering wheel according to a lock-to-lock ratio between the linear actuator and the steering wheel to vary an angle of the steered wheels, the controller programmed to:
    receive data indicative of the angular position of the ball screw nut from the rotation position sensor,
    determine a linear position of the actuator rod relative to the actuator axis based on the data indicative of the angular position of the ball screw nut,
    determine a target steering wheel position of the steering wheel relative to the steering wheel axis based on the linear position of the actuator rod,
    receive data indicative of a measured steering wheel position of the steering wheel relative to the steering wheel axis,
    compare the measured steering wheel position and the target steering wheel position, and
    vary the lock-to-lock ratio based on the comparison between the measured steering wheel position and the target steering wheel position to cause a difference between the measured steering wheel position and the target steering wheel position to be reduced in response to the steering wheel being rotated about the steering wheel axis.

2. The steer-by-wire control system of claim 1, further comprising a steered wheel angle sensor configured to measure an angle of the steered wheels and wherein the controller is programmed to determine the linear position of the actuator rod relative to the actuator axis based on the data indicative of the position of the ball screw nut and the angle of the steered wheels as measured upon startup of the controller.

3. The steer-by-wire control system of claim 1, wherein the lock-to-lock ratio is defined by an amount of rotation of the steering wheel to an amount of axial translation of the actuator rod.

4. The steer-by-wire control system of claim 1, wherein the controller is programmed to vary the lock-to-lock ratio in response to the difference between the measured steering wheel position and the target steering wheel position being greater than a preset value.

5. The steer-by-wire control system of claim 4, wherein the preset value is zero.

6. The steer-by-wire control system of claim 1, wherein the controller is programmed to vary the lock-to-lock ratio between a set minimum ratio and a set maximum ratio and wherein the set minimum ratio and the set maximum ratio are based on percentages of a default lock-to-lock ratio.

7. The steer-by-wire control system of claim 1, wherein the controller is programmed to decrease the lock-to-lock ratio in response to the steering wheel being rotated about the steering wheel axis away from the target steering wheel position.

8. The steer-by-wire control system of claim 1, wherein the controller is programmed to increase the lock-to-lock ratio in response to the steering wheel being rotated about the steering wheel axis toward the target steering wheel position.

9. The steer-by-wire control system of claim 1, wherein the controller is programmed to continuously vary the lock-to-lock ratio based on comparisons between measured steering wheel positions and target steering wheel positions for all speeds of the steered wheels and for all turn positions of the steered wheels.

10. A steer-by-wire control system comprising:
    a steering assembly including a steered wheel, a steering wheel configured to rotate about a steering wheel axis, and an actuator coupled with the steered wheel and configured to change a direction of the steered wheel in response to rotation of the steering wheel about the steering wheel axis, and
    a controller connected with the actuator and configured to cause the actuator to move between a plurality of positions in response to rotation of the steering wheel according to a lock-to-lock ratio between the actuator and the steering wheel, the controller programmed to:
    determine a target steering wheel position of the steering wheel relative to the steering wheel axis based on a measured position of the actuator,
    receive data indicative of a measured steering wheel position of the steering wheel relative to the steering wheel axis, and
    vary the lock-to-lock ratio based on a difference between the target steering wheel position and the measured steering wheel position.

11. The steer-by-wire control system of claim 10, wherein the actuator includes a ball screw nut, an actuator rod, and a rotation position sensor, the ball screw nut configured to rotate about an actuator axis to cause the actuator rod to translate axially relative to the actuator axis, the actuator rod configured to turn the steered wheel in response to the actuator rod translating axially, and the rotation position sensor configured to generate data indicative of an angular position of the ball screw nut relative to the actuator axis.

12. The steer-by-wire control system of claim 11, wherein the measured position of the actuator is based on the data indicative of the angular position of the ball screw nut.

13. The steer-by-wire control system of claim 12, further comprising a steered wheel angle sensor configured to generate data indicative of a measured angle of the steered wheel and wherein the measured position of the actuator is based on the data indicative of the measured angle of the steered wheels and the data indicative of the angular position of the ball screw nut from the rotational position sensor.

14. The steer-by-wire control system of claim 10, wherein varying the lock-to-lock ratio is performed in response to a difference between the measured steering wheel position and the target steering wheel position being greater than a preset value.

15. The steer-by-wire control system of claim 14, wherein the preset value is zero.

16. The steer-by-wire control system of claim 10, wherein the target steering wheel position of the steering wheel relative to the steering wheel axis and the measured position of the actuator have a linear relationship.

17. A method of operating a steer-by-wire control system, the method comprising:
    moving an actuator between a plurality of positions in response to rotation of a steering wheel about a steering wheel axis according to a lock-to-lock ratio to cause the actuator to turn a steered wheel,
    determining a position of the actuator,
    determining a target steering wheel position of the steering wheel relative to the steering wheel axis based on the position of the actuator,
    measuring a measured position of the steering wheel, and
    varying the lock-to-lock ratio based on the target steering wheel position and the measured position of the steering wheel.

18. The method of claim 17, wherein the actuator includes a ball screw nut, an actuator rod, and a rotation position sensor, the ball screw nut is configured to rotate about an actuator axis to cause the actuator rod to translate axially relative to the actuator axis, the actuator rod is configured to turn the steered wheel in response to the actuator rod translating axially, and the rotation position sensor is configured to generate data indicative of an angular position of the ball screw nut relative to the actuator axis.

19. The method of claim 18, wherein determining the position of the actuator is based on the data indicative of the angular position of the ball screw nut relative to the actuator axis.

20. The method of claim 19, wherein determining the position of the actuator is based on the data indicative of the angular position of the ball screw nut relative to the actuator axis and on data indicative of a measured angle of a steered wheel.

* * * * *